3,420,884
PROCESS FOR PREPARING PERFLUORO-
ALKYLTHIOIMIDATES
Edwin Dorfman, Grand Island, and Claude Thomas Bean, Jr., Niagara Falls, N.Y., assignors to Hooker Chemical Corporation, Niagara Falls, N.Y., a corporation of New York
No Drawing. Filed Dec. 28, 1964, Ser. No. 421,686
U.S. Cl. 260—566  3 Claims
Int. Cl. C07c *149/24*

ABSTRACT OF THE DISCLOSURE

An improved process for preparing perfluoroalkylthioimidates, particularly dimethylperfluoroglutarthioimidate, by reacting a mercaptan and a perfluoroalkylnitrile at a low temperature in the presence of a catalyst.

---

This invention relates to an improved process for preparing perfluoroalkylthioimidates and particularly for the production of dimethylperfluoroglutarthioimidate.

The prior art process for preparing perfluoroglutarthioimidate is not commercially desirable because of the poor yield of product obtained and the wide range of temperatures required by this process. Therefore, it is the object of this invention to provide a process for preparing perfluoroalkylthioimidates characterized by higher yields and simplicity of the operating conditions.

In accordance with this invention there is provided a process for preparing perfluoroalkylthioimidates by charging a reaction vessel with a catalyst, purging the vessel with an inert gas, condensing mercaptan in the reaction vessel, maintaining the reaction zone at a low temperature while adding perfluoroalkylnitrile gradually to the mercaptan with agitation and thereafter recovering the perfluoroalkylthioimidate after the completion of the reaction. The perfluoroalkylthioimidates of this invention are of the formula:

$$RSC(=NH)(CF_2)_nC(=NH)SR$$

wherein R is selected from the group consisting of alkyl and mononuclear aryl and $n$ is a number from one to twenty-two. It is preferable that when R is alkyl, R contains from 1 to 20 carbon atoms, and when aryl, R is mononuclear of 6 to 10 carbon atoms. Suitable R substituents include methyl, ethyl, tertiary butyl, isopropyl, benzyl, chlorobenzyl, phenyl lauryl, myristyl, cetyl and octadecyl. The dimethylperfluoroalkylthioimidates of the invention are useful as polymer intermediates.

Suitable perfluoroalkylnitriles for use in this invention include perfluoromalononitrile, perfluorosuccinonitrile, perfluoroadiponitrile, perfluorosuberonitrile, perfluoroazelaonitrile and perfluorosebaconitrile.

Suitable mercaptans for use in this invention include methyl mercaptan, ethyl mercaptan, lauryl mercaptan, tertiary butyl mercaptan, isopropyl mercaptan, myristyl mercaptan, cetyl mercaptan, octadecyl mercaptan, benzyl mercaptan, chlorobenzyl mercaptan and thiophenol.

The molar ratio of mercaptan to perfluoroalkylnitrile employed in the process of this invention is desirably from about 2:1 to about 9:1 and preferably from about 3:1 to about 7:1.

It is desirable to exclude moisture and oxygen from the reaction vessel in order that the reactants will not be impaired. While any inert gas may be used in the process of this invention, satisfactory results may be obtained by the use of nitrogen and the rare gases, such as argon and neon. The more preferred inert gas is nitrogen.

A suitable basic catalyst is employed in the process of this invention. The preferred catalyst is potassium carbonate, although other alkali metal carbonates, such as sodium or lithium carbonate, Lewis bases, and tertiary amines such as triethylamine and dimethylaniline may also be utilized in this process. Any catalytic amount may be employed, up to one percent by weight of mercaptan charged being preferred.

The time of reaction is dependent upon the temperature employed and quantities and rate of addition of nitrile. The reaction is exothermic and its completion is quite evident. In all cases it is desirable that the reaction be allowed to continue until all of the nitrile has been consumed. The nitrile is added to the reaction vessel at such a rate that no significant change in reaction temperature occurs. The gradually added nitrile is substantially consumed upon addition to the reaction vessel.

A low temperature is utilized throughout the process of this invention and it has been found that this temperature should be kept from about −30 degrees to about +10 degrees centigrade. Preferably, this temperature will be from about −5 to about +5 degrees centigrade. Thus, the temperature requirement of this process is readily obtainable and easily maintained, once obtained.

It is an additional advantage of this process that the process may be carried out at substantially atmospheric pressures.

The process of this invention results in product yields in excess of 90 percent, 95 percent being a typical yield. The prior art shows a process having an efficiency of about 30 percent.

The invention is illustrated by the following example. Parts are given by weight and temperatures are in degrees centigrade, herein.

EXAMPLE

Into a reaction vessel equipped with condenser, stirrer, addition funnel, gas inlet tube and trap for methyl mercaptan (Dry Ice), was added one part of potassium carbonate. The reaction vessel was purged with nitrogen, then 400 parts of methyl mercaptan were condensed in the reaction vessel. With a nitrogen atmosphere, 304 parts of perfluoroglutaronitrile were added in 5 to 6 hours with the reaction zone maintained at about zero degrees centigrade, and the condenser at −78 degrees centigrade to recover any volatilized reactant, which is then recycled. The reaction mixture was stirred at zero degrees centigrade for an additional four hours. The solid product was washed in toluene and carbon tetrachloride. The yield of crude product was 95 percent. The product decomposed at 118 to 127 degrees centigrade and its infrared spectrum showed the characteristic C=N band at 6.03 microns.

Similar results are obtained when other perfluoroalkylnitriles, such as perfluoromalononitrile, perfluorolaurylnitrile, perfluorooctadecylnitrile and perfluorosebaconitrile, are utilized in place of the perfluoroglutaronitrile shown in the above example. Likewise the methyl mercaptan used above may be replaced by ethyl mercaptan, benzyl mercaptan, tertiary butyl mercaptan and the like.

Although certain preferred embodiments of the invention have been disclosed for the purpose of illustration, it will be evident that various changes, modification may be made therein without departing from the spirit and scope of this invention.

What is claimed is:
1. A process for preparing perfluoroalkylthioimidates of the formula:

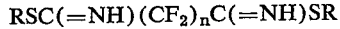

$$RSC(=NH)(CF_2)_nC(=NH)SR$$

wherein R is selected from the group consisting of alkyl containing from 1 to 20 carbon atoms, phenyl, benzyl, chlorobenzyl and hydroxyphenyl and $n$ is a number from one to 22 by charging to the reaction vessel a basic catalyst, purging the vessel with an inert gas, adding to the vessel a mercaptan selected from the group consisting of an alkyl mercaptan of 1 to 20 carbon atoms, phenyl mercaptan, benzyl mercaptan, chlorobenzyl mercaptan and thiophenol and maintaining the reaction vessel at a low temperature, from about −30 degrees centigrade while adding to about 10 degrees centigrade perfluoroalkylnitrile gradually to the mercaptan, with agitation.

2. A process for preparing dimethylperfluoroglutarthioimidate of the formula:

by charging to the reaction vessel a basic catalyst, purging the vessel with an inert gas, condensing methyl mercaptan in the vessel, maintaining the reaction vessel at a low temperature from about 30 degrees centigrade to about 10 degrees centigrade and adding perfluoroglutaronitrile graually to the methyl mercaptan, with agitation.

3. A process for preparing dimethylperfluoroglutarthioimidate of the formula:

by charging to the reaction vessel a catalytic amount of potassium carbonate, purging the vessel with nitrogen, condensing methyl mercaptan in the vessel, maintaining the reaction zone at a temperature of about −5 to about 5 degrees centigrade and at about atmospheric pressure, while adding perfluoroglutaronitrile gradually to the methyl mercaptan, with agitation, and recovering the reaction product.

References Cited

UNITED STATES PATENTS 3,170,949   2/1965   Proskow _____ 260—566 XR

OTHER REFERENCES

"Derwent Belgian Patents Report," No. 66A, pp. A6–A7, abstract of Patent No. 587,239 (1960).

Brown et al., "Journal Organic Chemistry," vol. 27, pp. 2858–63 (1962Q, QD241J6.

CHARLES B. PARKER, *Primary Examiner.*

R. V. HINES, *Assistant Examiner.*

PO-1050
(5/69)

UNITED STATES PATENT OFFICE
CERTIFICATE OF CORRECTION

Patent No. 3,420,884      Dated January 7, 1969

Inventor(s) Edwin Dorfman and Claude T. Bean, Jr.

It is certified that error appears in the above-identified patent and that said Letters Patent are hereby corrected as shown below:

Column 3, line 5, 6 and 7 should be corrected to read as follows---
"...perature, from about -30 degrees centigrade to about 10 degrees centigrade, while adding perfluoroalkylnitrile gradually to the mercaptan, with agitation."---.

Column 3, line 15, after the first "about", insert a minus sign (-) before 30.

SIGNED AND SEALED

APR 28 1970

(SEAL)
Attest:

Edward M. Fletcher, Jr.
Attesting Officer

WILLIAM E. SCHUYLER, JR.
Commissioner of Patents